(12) United States Patent
Johanson

(10) Patent No.: US 12,462,947 B2
(45) Date of Patent: Nov. 4, 2025

(54) WELDED CONDUCTORS FOR POWER TRANSMISSION CABLES

(71) Applicant: NEXANS, Courbevoie (FR)

(72) Inventor: Audun Johanson, Oslo (NO)

(73) Assignee: NEXANS, Courbevoie (FR)

( * ) Notice: Subject to any disclaimer, the term of this patent is extended or adjusted under 35 U.S.C. 154(b) by 0 days.

(21) Appl. No.: 17/338,389

(22) Filed: Jun. 3, 2021

(65) Prior Publication Data
US 2021/0398708 A1 Dec. 23, 2021

(30) Foreign Application Priority Data

Jun. 12, 2020 (EP) ..................................... 20305652

(51) Int. Cl.
| | | |
|---|---|---|
| H01B 1/02 | (2006.01) | |
| B23K 35/28 | (2006.01) | |
| C22C 21/00 | (2006.01) | |
| H01R 4/02 | (2006.01) | |
| H01R 4/62 | (2006.01) | |
| H01R 43/02 | (2006.01) | |

(52) U.S. Cl.
CPC ............ H01B 1/023 (2013.01); B23K 35/288 (2013.01); C22C 21/00 (2013.01); H01R 4/021 (2013.01); H01R 4/029 (2013.01); H01R 4/625 (2013.01); H01R 43/02 (2013.01)

(58) Field of Classification Search
CPC ......... H01B 1/023; H01R 4/021; H01R 4/625
See application file for complete search history.

(56) References Cited

U.S. PATENT DOCUMENTS

| | | | |
|---|---|---|---|
| 3,634,649 A | 1/1972 | Rager et al. | |
| 4,216,031 A * | 8/1980 | Chia ..................... | H01B 1/023 148/550 |
| 4,847,048 A * | 7/1989 | Nishi ..................... | C22C 21/06 420/544 |
| 5,171,378 A | 12/1992 | Kovarik et al. | |
| 6,783,730 B2 * | 8/2004 | Lin ......................... | C22C 21/00 420/553 |
| 8,349,462 B2 * | 1/2013 | Lin ......................... | C25D 9/06 420/544 |
| 10,797,411 B2 * | 10/2020 | Eiberger ................ | H01R 4/029 |
| 2010/0183869 A1 * | 7/2010 | Lin ......................... | C25D 11/18 420/544 |

(Continued)

FOREIGN PATENT DOCUMENTS

| | | |
|---|---|---|
| EP | 3 261 181 | 12/2017 |
| JP | 60-248858 | * 12/1985 |

OTHER PUBLICATIONS

International Search Report Oct. 15, 2020.

*Primary Examiner* — Chau N Nguyen
(74) *Attorney, Agent, or Firm* — CANTOR COLBURN LLP

(57) ABSTRACT

A conductor for a power transmission cable has a first conductor element and a second conductor element connected by a welding joint. The welding joint has a welding material alloy where the welding material alloy has an Al content of from 90% to 98% by weight, a Ni content of from 2% to 8% by weight, and a content of other metals and/or substances from 0% to 2% by weight, based on the total weight of the welding material alloy, wherein the Al content, Ni content and content of other metals and/or substances sum up to 100% by weight.

13 Claims, 2 Drawing Sheets

(56) References Cited

U.S. PATENT DOCUMENTS

| | | | |
|---|---|---|---|
| 2015/0315688 A1* | 11/2015 | Doty | C22C 21/16 |
| | | | 148/439 |
| 2018/0247723 A1 | 8/2018 | Hedlund et al. | |
| 2019/0066871 A1 | 2/2019 | Johanson | |
| 2019/0127833 A1* | 5/2019 | Shyam | C22F 1/057 |
| 2022/0112581 A1* | 4/2022 | Chehab | B33Y 40/20 |
| 2022/0126367 A1* | 4/2022 | Chehab | B33Y 40/20 |

* cited by examiner

WELDED CONDUCTORS FOR POWER TRANSMISSION CABLES

RELATED APPLICATION

This application claims the benefit of priority from European Patent Application No. 20 305 652.8, filed on Jun. 12, 2020, the entirety of which is incorporated by reference.

FIELD OF THE INVENTION

The present invention relates generally to the art of welded conductors for power transmission cables. More particularly, the invention concerns conductors welded by a high conductive welding material.

BACKGROUND

Power cables comprise one or more cores or conductors, usually disposed within outer layers of insulating materials. The wire and cable industry use a variety of metals/alloys for conductors, but the two most common are copper- and aluminum-alloys. Conductors based on copper or aluminum have different properties such as conductivity, tensile strength and weight.

Using aluminum successfully is a matter of understanding the capability of this conductive metal and how to deal with the challenges it presents. Aluminum has lower electric conductivity compared to copper but is cheaper and has lower weight.

Aluminum conductors have been found to be suitable for use in electrical cables and high voltage (HV) cables, i.e., cables adapted for voltages of 50 kV and above. HV-cables are used to transmit electrical power over long distances both on land and subsea. To make long power transmission cables, shorter conductors are joint by welding.

In the aspect of welding conductors for power transmission cables, it is important that the welding material does not negatively affect the conductivity of the conductors to such extent that the joint significantly increases the local temperature due to resistive heating, while simultaneously showing similar strength and excellent weldability.

For instance, high conductivity normally implies high purity which in turn causes low fluidity during solidification of the welding joint which may lead to a non-desirable porosity of the joint. The addition of further metals to the aluminum-based welding material is critical to obtain a weldable material being less sensitive to mechanical force.

Thus, high weldability alloys are typically consistent with casting alloys where weld pool fluidity and suitable solidification range is achieved by adding large amounts of alloying elements (for example silicon or magnesium). The problem is that high amounts of alloying elements such as silicon or magnesium also reduce the material conductivity, which in turn can increase the temperature over the joints which then could compromise the insulation system.

Thus, the development of a welding material combining high conductivity, strength and weldability is critical but also highly challenging.

There are publications reporting methods for production of aluminum-based welding materials and aluminum-based welding materials for welding of conductors for power transmission cables.

For instance, EP0539670 A2 discloses a method for producing a weld metal for use in welding of aluminum conductors wherein the welding material comprises silicon and aluminum.

EP3350812 B1 discloses conductors for power transmission cables wherein the conductors are welded by using a welding material alloy that comprises at least 85.2% by weight aluminum, and from about 4.0% to 13.00% by weight silicon, or a welding material alloy that has an aluminum content of at least 99.5% by weight and a titanium content of from 0.10% to 0.50% by weight.

SUMMARY OF THE INVENTION

Even though there are reports describing conductors for power transmission cables comprising welding joints, there is still an ever-existing need for further conductors for power transmission cables comprising welding joints comprising welding material, wherein the welding material shows satisfactory weldability properties, has similar or improved tensile strength compared to the strength of the conductor elements and at the same time affecting the conductivity of the conductor negatively to a lesser extent compared to a welding material comprising high amounts of Si or Mg.

The present invention has as its objects to overcome one or more of the disadvantages of the prior art, especially regarding the conductivity and weldability of the welded joint.

The present inventors have solved the above-mentioned need by providing a conductor for a power transmission cable wherein the conductor comprises a first conductor element and a second conductor element connected by a welding joint wherein the welding joint comprises a welding material alloy wherein welding material alloy has an aluminum content of from 90% to 98% by weight, a nickel content of from 2% to 8% by weight, and a content of other metals and/or substances from 0% to 2% by weight based on the total weight of the welding material alloy, wherein the aluminum content, nickel content and content of other metals and/or substances sum up to 100% by weight.

In a first aspect, the present invention provides a conductor for a power transmission cable wherein the conductor comprises a first conductor element and a second conductor element connected (to each other) by a welding joint wherein the welding joint, comprises a welding material alloy characterized in that the welding material alloy has an Al content of from 90% to 98% by weight, a Ni content of from 2% to 8% by weight, and a content of other metals and/or substances from 0% to 2% by weight, based on the total weight of the welding material alloy, wherein the Al content, Ni content and content of other metals and/or substances sum up to 100% by weight.

The other metals and/or substances can also be called unavoidable impurities.

In some embodiments according to the first aspect, the welding material alloy has an Al content of from 91% to 96% by weight, a Ni content of from 2% to 7% by weight, preferably from 3% to 7% by weight, and more preferably from 4% to 7% by weight, and even more preferably from 3% to 4.5% by weight, based on the total weight of the welding material alloy.

In one further embodiment according to the first aspect, the content of other metals and/or substances of the welding material alloy is from 0.01% to 1.5%, preferably from 0.05% to 1% by weight, based on the total weight of the welding material alloy.

In some embodiments according to the first aspect, the content of other metals and/or substances of the welding material alloy comprises one or more, preferably three or more, of Ti, Zr, B, C, Si, Fe, Cu, Mn, Mg, Zn, V, Sc, and Cr.

In a preferred embodiment, the welding material alloy comprises at most 0.7% by weight of Si as other metals and/or substances, preferably at most 0.5% by weight of Si as other metals and/or substances, more preferably at most 0.25% by weight of Si as other metals and/or substances, and even more preferably at most 0.08% by weight of Si as other metals and/or substances, based on the total weight of the welding material alloy.

In a preferred embodiment, the welding material alloy comprises at most 0.7% by weight of Mg as other metals and/or substances, preferably at most 0.5% by weight of Mg as other metals and/or substances, more preferably at most 0.05% by weight of Mg as other metals and/or substances, and even more preferably at most 0.025% by weight of Mg as other metals and/or substances, based on the total weight of the welding material alloy.

In a preferred embodiment, the other metals and/or substances of the welding material alloy comprise:
- at least Ti, Zr, and B, and one or more of Si, Fe, Cu, Mn, Mg, Zn, V, Sc, and Cr; or
- at least Ti, Zr, and C, and one or more of Si, Fe, Cu, Mn, Mg, Zn, V, Sc, and Cr; or
- at least Ti, Zr, B, and C, and one or more of Si, Fe, Cu, Mn, Mg, Zn, V, Sc, and Cr.

In some embodiments, the content of B is ⅕ with regard to the content of Ti. In some embodiments, the content of C is 1/20 with regard to the content of Ti.

In some embodiments according to the first aspect, the content of any of the other metals and/or substances each is from 0% to 0.7% by weight, preferably from 0.01% to 0.5% by weight, based on the total weight of the welding material alloy.

In certain embodiments, the content of Fe is at most 0.2% by weight, based on the total weight of the welding material alloy.

In some embodiments, according to the first aspect, the other metals and/or substances of the welding material alloy comprise at least Ti, Zr, and B, wherein the Ti content is from 0.1% to 0.3% by weight, preferably from 0.1% to 0.2% by weight, the Zr content is at most 0.05% by weight, and the B content is at most 0.05% by weight, based on the total weight of the welding material alloy.

In some embodiments according to the first aspect, the other metals and/or substances of the welding material alloy comprise Ti, Zr, and B, wherein the Ti content is from about 0.1% to 0.3% by weight, preferably from 0.1% to 0.2% by weight, the Zr content is at most 0.05% by weight, and the B content is from 0.018 to 0.06%, based on the total weight of the welding material alloy.

The other metals and/or substances of the welding material comprising Ti, Zr, and B, may in some further embodiments comprise Si, Fe, Cu, Mn, Mg, Zn, V, Sc, and Cr, wherein the Si content is at most 0.25% by weight, the Fe content is at most 0.4% by weight, the Zn content is at most 0.07% by weight, and the content of any of Cu, Mn, Mg, V, Sc, and Cr, each is at most 0.05% by weight, based on the total weight of the welding material alloy.

In some embodiments, the other metals and/or substances of the welding material alloy comprise at least Ti, Zr, and C, and wherein the Ti content is from about 0.1% to 0.3% by weight, preferably from 0.1% to 0.2% by weight, the Zr content is at most 0.05% by weight, and the C content is from 0.005% to 0.015% by weight, based on the total weight of the welding material alloy.

The other metals and/or substances of the welding material comprising Ti, Zr, and C, may in some further embodiments comprise Si, Fe, Cu, Mn, Mg, Zn, V, Sc, and Cr, wherein the Si content is at most 0.25% by weight, the Fe content is at most 0.4% by weight, the Zn content is at most 0.07% by weight, and the content of any of Cu, Mn, Mg, V, Sc, and Cr, each is at most 0.05% by weight, based on the total weight of the welding material alloy.

In some embodiments according to the first aspect, the other metals and/or substances of the welding material alloy comprise Ti, Zr, B, and C, wherein the Ti content is at most 0.1% by weight, the Zr content is from 0.1% to 0.6% by weight, preferably from 0.1% to 0.5% by weight, more preferably from 0.1 to 0.4% by weight, even more preferably from 0.1% to 0.3% by weight, even more preferably from 0.1% to 0.2% by weight, the B content is at most 0.05% by weight, and the C content is at most 0.05% by weight, based on the total weight of the welding material alloy.

The other metals and/or substances of the welding material comprising Ti, Zr, B, and C, may in some further embodiments comprise Si, Fe, Cu, Mn, Mg, Zn, V, Sc, and Cr, wherein the Si content is at most 0.25% by weight, the Fe content is at most 0.4% by weight, the Zn content is at most 0.07% by weight, and the content of any of Cu, Mn, Mg, V, Sc, and Cr, each is at most 0.05% by weight, based on the total weight of the welding material alloy.

The other metals and/or substances of the welding material comprise one or more grain refining elements to improve the solidification and weldability of the welding material.

In some embodiments, the first conductor element and the second conductor element are made of same metal material or of dissimilar metal material, wherein the metal material(s) is selected from an aluminum alloy and a copper alloy, wherein the aluminum alloy is preferably selected from a group comprising Al 1000 series, Al 6000 series and Al—Zr alloys.

In some embodiments, the aluminum alloy of the first conductor element and the second conductor element is selected from the group comprising Al 1000 series, Al 6000 series and Al—Zr alloys.

In some embodiments according to the first aspect, the aluminum alloy of the first conductor element and the second conductor element comprises more than 97% by weight aluminum, and from 0% to 2.1% by weight other metals and/or substances.

In some embodiments, the aluminum alloy of the first conductor element and the second conductor element is selected from Al 1100, Al 1350, Al 1370, Al 6101, Al 6201 and Al—Zr alloys, said Al—Zr alloys comprising for example more than 97.8% by weight Al, from 0.1% to 0.7% by weight Zr, and from 0% to 2.1% by weight other metals and/or substances.

In some embodiments according to the first aspect, the other metals and/or substances of the aluminum alloy of the first conductor element and the second conductor element comprise Si, Fe, Cu, Mn, Mg, Cr, Zn, Ga, V, Ti, B, Zr, and unavoidable impurities.

In some embodiments, conductivity of the welding material is above 30% IACS, preferably above 35% IACS, more preferably above 40% IACS, even more preferably above 43% IACS, and even more preferably above 45% IACS, as measured according to IEC 60468.

In a second aspect, the present invention provides a power transmission cable, comprising the conductor according to the first aspect and any embodiments thereof.

In a third aspect, the present invention provides a method for production of a conductor for a power transmission cable, according to the first aspect and any embodiments thereof comprising the steps:

a. providing at least one first conductor element and at least one second conductor element; and
b. joining the first conductor element and the second conductor element by welding, thereby obtaining the conductor, wherein the welding is performed by using a welding material alloy having an Al content of from 90% to 98% by weight, a Ni content of from 2% to 8% by weight, and a content of other metals and/or substances from 0 to 2% by weight, based on the total weight of the welding material alloy, wherein the Al content, Ni content, and content of other metals and/or substances sum up to 100% by weight.

DETAILED DESCRIPTION

Figure 1:
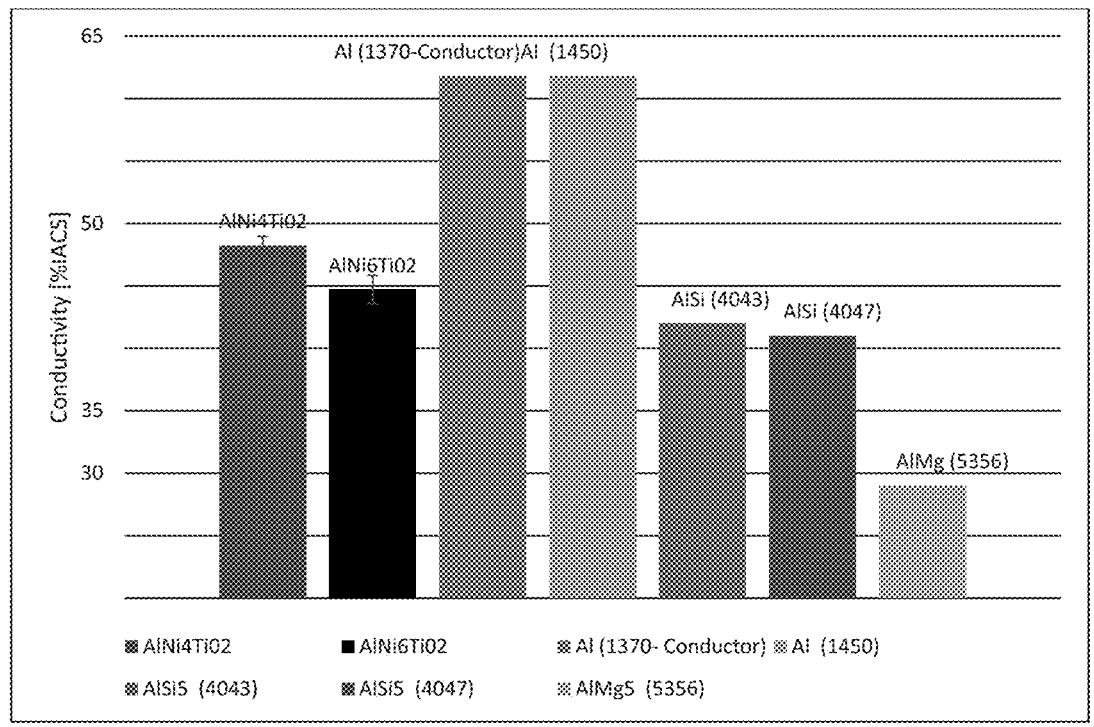
FIG. 1 depicts conductivity of welding materials (AlNi4TiO2, AlNi6TiO2) according to the invention compared to conductivity of the aluminum alloy of the first conductor element and second conductor element being welded according to one embodiment of the invention (1370, minimum of 99% by weight aluminum), and the conductivity of other standard aluminum alloys such as Al 1450 (minimum of 99% by weight aluminum) and aluminum alloy comprising high content of silicon (AlSi, 4043 and 4047) or magnesium (AlMg, 5356).

In the following description, various examples and embodiments of the invention are set forth to provide the skilled person with a more thorough understanding of the invention. The specific details described in the context of the various embodiments and with reference to the attached drawings, are not intended to be construed as limitations.

Where a numeric limit or range is stated, the endpoints are included. Also, all values and sub-ranges within a numerical limit or range are specifically included as if explicitly written out.

Welding Material

As mentioned above, the present inventor has surprisingly found that a welded conductor wherein the aluminum based welding material comprises an Al content of from 90% to 98% by weight, and a nickel content from 2% to 8% by weight, and a content of other metals and/or substances of from 0% to 2% by weight, has improved conductivity compared to welded conductors in which the aluminum based welding material comprises high amounts of silicon. Additionally, the Al—Ni alloy of the welding material is still being weldable and has improved tensile strength, compared to the material of the first conductor element and second conductor element being joint.

The other metals and/or substances of the welding material comprises one or more grain refining elements to improve the solidification and weldability of the welding material. In particular, a conductor comprising nickel from 2% to 8% by weight, preferably from 4% to 7% by weight, and wherein the other metals and/or substances of the alloy comprises one or more, preferably three or more, of Ti, Zr, B, C, Si, Fe, Cu, Mn, Mg, Zn, V, Sc, and Cr, display improved conductivity, weldability, and tensile strength.

Table 1 below depicts alternative embodiments of the welding material according to the invention.

TABLE 1

| Aluminum content [wt %] | 91-96 |
|---|---|
| Ni [wt %] | 4-7 |
| Other metals and/or substances content [wt %] | Si < 0.25 |
| | Fe < 0.40 |
| | Cu < 0.05 |
| | Mn < 0.05 |
| | Mg < 0.05 |
| | Zn < 0.07 |
| | V < 0.05 |
| | Sc < 0.05 |
| | Cr < 0.05 |

| | Alternative 1 | Alternative 2 | Alternative 3 |
|---|---|---|---|
| Ti [wt %] | 0.1-0.3 | 0.1-0.3 | <0.1 |
| Zr [wt %] | <0.05 | <0.05 | 0.1-0.6 |
| B [wt %] | 0.018-0.06 (ratio of 1/5 with regard to Ti) | | <0.05 |
| C [wt %] | | 0.005-0.015 (ratio of 1/20 with regard to Ti) | <0.05 |
| Conductivity, % IACS | >43% | | |

In some embodiments conductivity of the welding material is above 30% IACS, preferably above 35% IACS, more preferably above 40% IACS, even more preferably above 43% IACS, and even more preferably above 45% IACS, as measured according to IEC 60468.

Conductivity according to the present invention is the degree to which a specified material conducts electricity, calculated as the ratio of the current density in the material to the electric field which causes the flow of current. Electric conductivity may be measured in % IACS according to IEC 60468 standard.

The alternative welding materials according to the invention and as for example shown in Table 1 above (alternatives 1, 2, and 3), may be used as welding material when joining conductor elements according to the invention. Examples of Al-alloy materials for the conductor elements according to the invention are described in Table 2 below. Table 3 below is an example of a welding material alloy according to the invention.

According to the invention, one of the conductor elements to be joined may, in some embodiments, be a copper alloy. As described further below, the first conductor element and the second conductor element are in some embodiments made of same metal material or in other embodiments of dissimilar metal material, wherein the metal material(s) is selected from an aluminum alloy and a copper alloy.

The welding material may be in forms of wires, rods, sticks or any suitable form of added metal. Wires include, without limitations, continuous wires intended for wire feeding applications used in, for example, metal inert gas (MIG) welding. Welding material in forms of rods or sticks are used in, for example, tungsten inert gas (TIG) and stick welding. The welding material melts together with the conductor material during the welding process, and thus forms a joint. Alternatively, the joint material is deposited as powder followed by re-melting, by any alternative energy source.

The welding joint may be any type of joint, including a v-joint. A v-joint is a type of butt weld in which two metal conductor elements are joined in the same plane. The v-joint has at least one bevelled edge, and commonly two bevelled side edges, thus forming a v-shape. The v-joint may be a single v-joint or a double v-joint. V-joints are mechanically strong, require minimum amount of welding material and are easy to process. A small joint comprising minimum amount of welding material thus affects the electrical properties of the conductor minimally.

The welding process used for obtaining the welding joint may be achieved by any suitable welding process known in the art, such as gas tungsten arc welding (GTAW) also known as tungsten inert gas (TIG) welding, or gas metal arc welding (GMAW), such as metal inert gas (MIG) welding. Alternatively, the welding joint can be achieved by any energy source to re-melt the welding rod such as a laser or electron beam.

Any of the above-described welding processes may be used in welding conductors, according to the present invention, for use in power cables such as power transmission cables.

The conductors according to the present invention are intended for transmission of direct current (DC), but the conductors may also be for transmission of alternating current (AC). The conductors may be high voltage direct current (HVDC) or high voltage alternating current (HVAC) cables for use onshore or offshore.

Conductor Elements

The conductor according to the invention comprises a first conductor element and a second conductor element joined by a weld. The first conductor element and the second conductor element are, in some embodiments, made of same metal material, or in other embodiments, of dissimilar metal material wherein the metal material(s) is selected from an aluminum alloy and a copper alloy. The first conductor element and the second conductor element may be of same or different diameter. Examples of preferred aluminum alloys of the conductor elements according to the invention are shown in Table 2 below.

TABLE 2

| Alloy, % by weight. Total is always 100% | Alternative 1 1xxx series such as 1350/1370 | Alternative 2 6xxx series such as 6101/6201 | Alternative 3 Zr- alloy |
|---|---|---|---|
| Si | <0.20 | 0.3-0.7 | <0.20 |
| Fe | <0.45 | <0.5 | <0.5 |
| Cu | <0.20 | <0.1 | <0.1 |
| Mn | <0.02 | <0.03 | <0.03 |
| Mg | <0.10 | 0.35-0.90 | <0.10 |
| Cr | <0.02 | <0.03 | <0.03 |
| Zn | <0.10 | <0.10 | <0.10 |
| Ga | <0.05 | <0.05 | <0.05 |
| V + Ti | <0.03 | <0.03 | <0.03 |
| Ti | <0.03 | <0.10 | <0.10 |
| B | <0.07 | <0.07 | <0.07 |
| Zr | <0.05 | <0.05 | 0.1-0.7 |
| Other | <0.02 | <0.03 | <0.03 |
| Total | <0.1 | <0.1 | <0.1 |
| Al | >=99.5 | Rem. >=97.2 | Rem. >=97.8 |

The term "conductor element" according to the invention may be a standard conductor, a solid conductor, a profile wire conductor or a combination. Each conductor element according to the invention may be of any length, for example, standard conductors may be from a few meters up to thousands of meters. A solid conductor according to the invention may, in certain embodiments, be a mechanical joint in form of a transition element, such as a transition joint. The mechanical joint according to the invention is a shorter conductor element compared to standard conductors. Examples of a transition element that may be welded to a standard conductor element are disclosed in EP3261181 A1, cf. element 5 of FIGS. 2 and 3 and claims 1-17.

The invention also relates to a method for manufacturing a conductor for a power transmission cable, as described above, comprising the steps:

a. providing a first conductor element and a second conductor element; and b. joining the first conductor element and the second conductor element by welding, thereby obtaining the conductor, wherein the welding is performed by using a welding material alloy having an Al content of from 90% to 98% by weight, a Ni content of from 2% to 8% by weight, and a content of other metals and/or substances from 0 to 2% by weight, based on the total weight of the welding material alloy, wherein the Al content, Ni content and content of other metals and/or substances sum up to 100% by weight.

The welding joint obtained between the first conductor element and the second conductor element may be any type of joint including a v-joint. The welding process used for obtaining the welding joint may be achieved by any suitable welding process known in the art and as described above.

Power Cables

The power cables according to the invention may be cables submerged in sea or fresh waters, submarine water cables or land cables.

To make a power transmission cable, the conductors are normally surrounded by an electric insulation system to cover the conductor. An electric insulation system may comprise one or more insulation layers. The electrically insulating layer may be a polymer layer based on a crosslinked polyolefin, such as a crosslinked polyethylene (XLPE) or a crosslinked ethylene/propylene, or ethylene/propylene/diene elastomer (EPDM). Alternatively, the insulation system may comprise layers of mass-impregnated paper.

Figure 4:
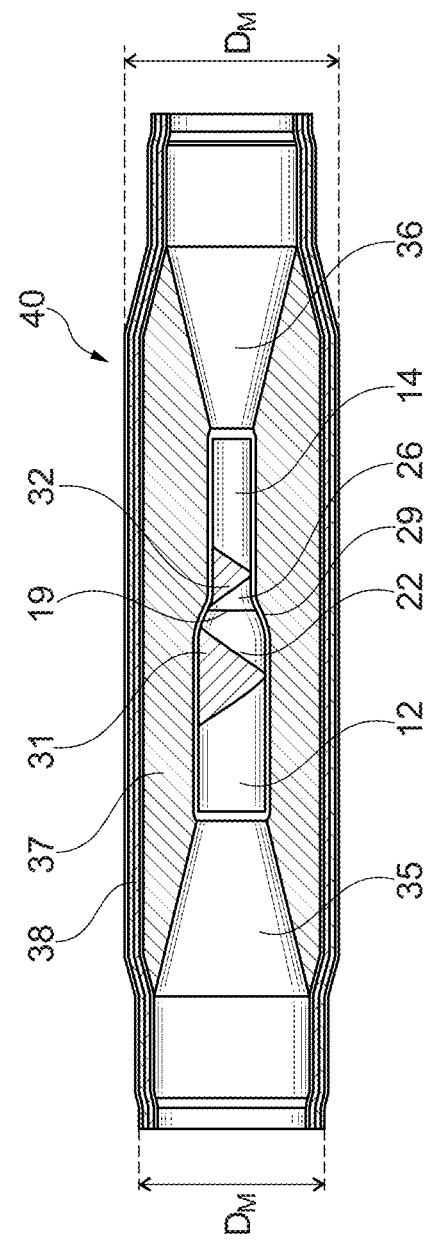
FIG. 4 depicts an example of a high voltage (HV)-cable including welding joints, insulation and outer sheathing.

An example of a cable design in which the conductor, according to the present invention may be incorporated, is illustrated in FIG. 4.

As shown in FIG. 4, the first electrical HV-cable 12 comprises electrical insulation 35, which has been partly removed at the end to allow for welding of the first electrical cable 12 having an end portion 29 to the second electrical HV-cable 14 comprises electrical insulation 36, which has been partly removed at the end to allow for welding of the second electrical HV-cable 14.

The electrical insulation is chosen according to the conductor material of the electrical HV-cable. If the conductor material of the first electrical HV-cable 12 is copper, then the electrical insulation 35 will be an insulation material which is suitable for a copper conductor. If the conductor material of the second electrical HV-cable 14 is aluminium, then the electrical insulation 36 will be an insulation material which is suitable for an aluminium conductor. The cable comprises a first weld joint 31 and a second weld joint 32. 22 depicts a first transition element and 29 a second transition element.

To cover the HV-cable joint 40, there is a further provided electrical insulation 37 that covers and overlaps with the electrical insulation 35 covering the first electrical HV-cable 12, and the electrical insulation 36 covering the second electrical HV-cable 14. Finally, the electrical HV-cable is provided with outer sheathing 38, which also covers the HV-cable joint 40, as indicated in FIG. 4. The outer sheathing 38 will normally comprise a plurality of different layers, but this is not part of the present invention and will not be described further herein. Other types of layers not shown in FIG. 4 may also be included in the electrical cable.

The power cable can also be one of many elements, such as multiple power cables, fiber optical cables or tubes bundled together in a single slender structure. Subsea power cables generally include one or more dedicated load bearing armoring elements in the shape of steel wires.

Having generally described this invention, a further understanding can be obtained by reference to certain specific examples. The examples illustrate the effects of the conductor welding joints according to the invention, and are provided herein for purposes of illustration only, and are not intended to be limiting.

EXAMPLES

Materials

The chemical compositions of two test welding materials, according to some embodiments of the invention, were used in a conductivity test, a welding test and a tensile test, shown in Table 3 below. The amounts of the different metals in the alloys are in % by weight, and the total adds up to 100%. The chemical analysis of the alloys is measured by optical emission spectroscopy (OES) and energy-dispersive X-ray spectroscopy (EDS).

The material of the conductor elements used in the test experiments was an aluminum alloy of the 1xxx Al-series and depicted as 1370. Its chemical composition is shown in Table 2 above.

TABLE 3

|    | AlNi$_4$TiO$_2$ | AlNi6TiO$_2$ |
|----|---------|---------|
| Al | 95.90922 | 95.77955 |
| Ti | 0.175606 | 0.190461 |
| Ni | 4.360333 | 6.748095 |
| ZR | 0.001524 | 0.003457 |
| Si | 0.054126 | 0.058404 |
| Fe | 0.196945 | 0.196891 |
| Cu | 0.005463 | 0.005655 |
| Mn | 0.003798 | 0.004462 |
| Mg | 0.013725 | 0.021176 |
| Zn | 0.001388 | 0.006974 |
| P  | 0.001889 | 0.001976 |
| Li | 0.003261 | 0.048354 |
| Be | 0.000125 | 0.000122 |
| B  | 0.000289 | 0.000501 |
| Na | 0.004695 | 0.002422 |
| Co | 0.001309 | 0.00504 |
| Cr | 0.003805 | 0.001855 |
| V  | 0.004513 | 0.006274 |
| Ca | 0.002257 | 0.000644 |
| Sr | 0.000132 | 0.000501 |
| Ag | 0.0001 | 0.000133 |
| Cd | 0.000463 | 0.001054 |
| Sn | 0.005695 | 0.015446 |
| Bi | 0.003611 | 0.00537 |
| Pb | 0.000508 | 0.011982 |
| Hg | 0.002 | 0.0002 |
| La | 0.000597 | 0.001255 |
| Ga | 0.019094 | 0.027934 |
| Sc | 0.0001 | 0.000112 |

Welding Test

The joints were welded with TIG-welding.

Figure 3:
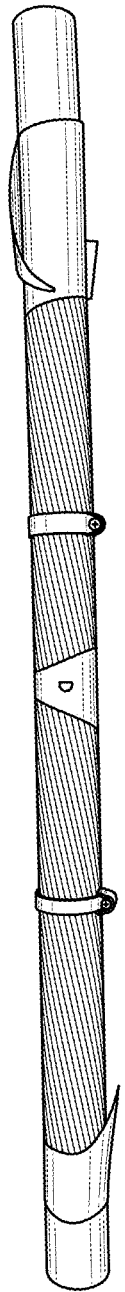
FIG. 3 depicts an example of welded conductor, wherein the welding material and the material of the first conductor element and the second conductor element is the same as described in FIG. 2 above.

An example of a welded conductor according to the invention is depicted in FIG. 3, wherein the welding material is AlNi4TiO2 as described above, and the material of the two conductor elements is according to the standard 1xxx series and depicted as 1370.

Tensile Strength Test

Figure 2:
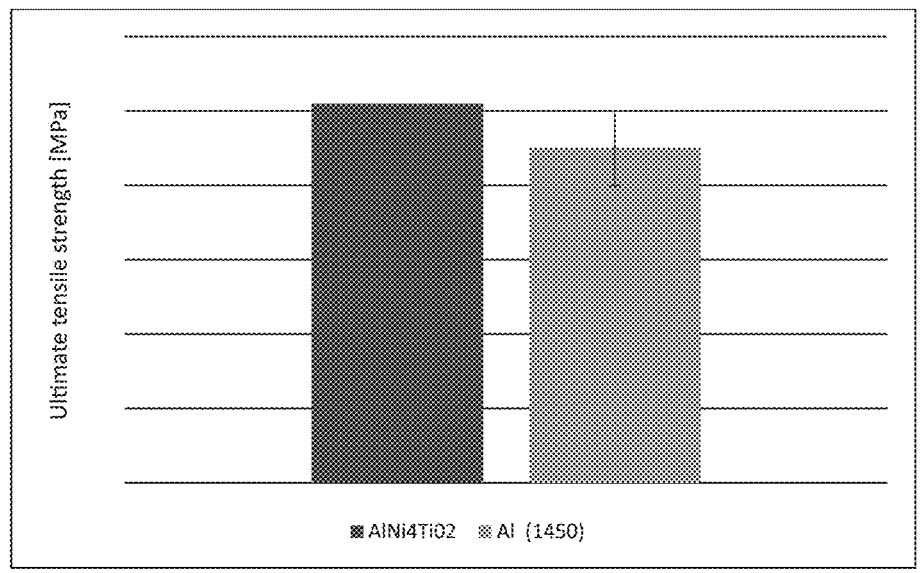
FIG. 2 depicts test results from a tensile test, wherein the welding material is AlNi4TiO2 and the material of the first conductor element and the second conductor element being welded is a standard aluminum alloy depicted as 1370.

The welded conductor shown in FIG. 3 was used in a tensile strength test performed according to ISO6892. The result of the tensile test is depicted in FIG. 2, in form of a bar plot. The result shows that the welding joint according to the invention is stronger and tolerates a higher mechanical force, compared to welding material 1450 that has similar chemical properties as the conductor 1370 material.

Conductivity of Welding Material

The conductivity of the welding material AlNi4TiO2 and AlNi6TiO2 were measured, and the result of the measurement is depicted in FIG. 1. The conductivity is measured as % IACS, according to the IEC 60468 standard. The bar-chart in FIG. 1 clearly demonstrate that AlNi4TiO2 and AlNi6TiO2 welding materials have better conductivity and thus affect the conductivity of the conductor elements to a lower degree compared to a welding material comprising high amount of silicon (Si) such as Al-alloy 4043 and Al-alloy 4047, or comprising magnesium (Mg) such as Al-alloy 5356.

The invention claimed is:

1. A conductor for a power transmission cable wherein the conductor comprises
    a first conductor element; and
    a second conductor element connected by a welding joint,
    wherein the welding joint has a welding material alloy,
    wherein the welding material alloy has an Al content of from 91% to 96% by weight, a Ni content of from 3% to 4.5% by weight, and a content of other metals and/or substances from up to 2% by weight, based on the total weight of the welding material alloy,
    wherein the other metals and/or substances of the welding material alloy includes Ti, where the Ti content is from 0.1% to 0.3% by weight, based on the total weight of the welding material alloy,
    wherein the other metals and/or substances of the welding material includes at most 0.08% Si by weight,
    wherein the other metals and/or substances of the welding material includes a most 0.025% Mg by weight, and
    wherein the Al content, Ni content and content of other metals and/or substances sum up to 100% by weight.

2. The conductor according to claim 1, wherein the welding material alloy has an Al content of from 91% to 96% by weight, and a Ni content of from 4% to 4.5% by weight, based on the total weight of the welding material alloy.

3. The conductor according to claim 1, wherein the other metals and/or substances of the welding material alloy further comprise one or more of Zr, B, C, Fe, Cu, Mn, Zn, V, Sc, and Cr.

4. The conductor according to claim 1, wherein the other metals and/or substances of the welding material alloy further comprise at least Zr, and B, and one or more of Fe, Cu, Mg, Zn, V, Sc, and Cr; or at least Zr, and C, and one or more of Fe, Cu, Mg, Zn, V, Sc, and Cr; or at least Zr, B, and C, and one or more of Fe, Cu, Mg, Zn, V, Sc, and Cr.

5. The conductor according to claim 1, wherein the content of any of the other metals and/or substances each, aside from Ti, Si, and Mg is from 0% to 0.7% by weight, based on the total weight of the welding material alloy.

6. The conductor according to claim 1, wherein the other metals and/or substances of the welding material alloy additionally comprise Zr, and B, wherein the Zr content is at most 0.05% by weight, and the B content is from 0.018% to 0.06% or at most 0.05% by weight, based on the total weight of the welding material alloy.

7. The conductor according to claim 1, wherein the other metals and/or substances of the welding material alloy additionally comprise Zr, and C, and wherein the Zr content is at most 0.05% by weight, and the C content is from 0.005% to 0.015% by weight, based on the total weight of the welding material alloy.

8. The conductor according to claim 1, wherein the first conductor element and the second conductor element are made of same metal material or of dissimilar metal material, wherein the metal material(s) is selected from an aluminum alloy and a copper alloy.

9. The conductor according to claim 8, wherein the aluminum alloy of the first conductor element and the second conductor element comprises more than 97% by weight aluminum, and from 0% to 2.1% by weight other metals and/or substances.

10. The conductor according to claim 8, wherein the aluminum alloy of the first conductor element and the second conductor element is selected from Al 1100, Al 1370, Al 6101, Al 6201 and Al—Zr alloys.

11. The conductor according to claim 1, wherein conductivity of the welding material is above 30% IACS, as measured according to IEC 60468.

12. A power transmission cable comprising the conductor according to claim 1.

13. A method for manufacturing a conductor for a power transmission cable, comprising the steps:
  a. providing a first conductor element and a second conductor element; and
  b. joining the first conductor element and the second conductor element by welding, thereby obtaining the conductor,
  wherein the welding is performed by using a welding material alloy having an Al content of from 91% to 96% by weight, a Ni content of from 3% to 4.5% by weight, and a content of other metals and/or substances from up to 2% by weight, based on the total weight of the welding material alloy,
  wherein the other materials and/or substances of the welding material alloy includes Ti, where the Ti content is from 0.1% to 0.3% by weight, based on the total weight of the welding material alloy,
  wherein the other metals and/or substances of the welding material includes at most 0.08% Si by weight,
  wherein the other metals and/or substances of the welding material includes a most 0.025% Mg by weight, and
  wherein the Al content, Ni content and content of other metals and/or substances sum up to 100% by weight.

* * * * *